United States Patent
Ohtani et al.

[11] Patent Number: 5,519,485
[45] Date of Patent: May 21, 1996

[54] STEREO IMAGE MEASURING APPARATUS

[75] Inventors: Hitoshi Ohtani; Fumio Ohtomo; Hiroyuki Aoki, all of Tokyo, Japan

[73] Assignee: Kabushiki Kaisha Topcon, Tokyo, Japan

[21] Appl. No.: 101,487

[22] Filed: Aug. 2, 1993

[30] Foreign Application Priority Data

Jul. 31, 1992 [JP] Japan .................................. 4-224670
Jul. 31, 1992 [JP] Japan .................................. 4-224671

[51] Int. Cl.⁶ .................................................. G01C 11/00
[52] U.S. Cl. .................................. 356/2; 348/52; 348/565
[58] Field of Search ........................... 356/2; 250/558; 348/52, 565

[56] References Cited

U.S. PATENT DOCUMENTS

| | | | |
|---|---|---|---|
| 4,849,912 | 7/1989 | Leberl et al. | 364/525 |
| 5,032,912 | 7/1991 | Sakariassen | 348/52 |
| 5,040,067 | 8/1991 | Yamazaki | 348/565 |
| 5,113,259 | 3/1992 | Romesburg et al. | 348/565 |
| 5,220,441 | 6/1993 | Gerstenberger et al. | 356/2 |

OTHER PUBLICATIONS

"Deluxe Paint II manual", Electronics Arts, copyright 1986, pp. 2.6–2.7.

*Primary Examiner*—Richard A. Rosenberger
*Attorney, Agent, or Firm*—Brumbaugh, Graves, Donohue & Raymond

[57] ABSTRACT

The present invention relates to a stereo image measuring apparatus for displaying stereo images and effecting three-dimensional measurement and a correlation process on a screen for displaying the stereo images, and particularly to a stereo image measuring apparatus for making it possible to easily take hold of measuring points and to effect a correlation process after feature points have been extracted in the vicinity of the position where each cursor exists. Corresponding points for other image, which correspond to measuring points for one image, are searched. Each of display units serves so as to apply marks on the determined corresponding points based on the measured points and the result of the correlation process.

5 Claims, 8 Drawing Sheets

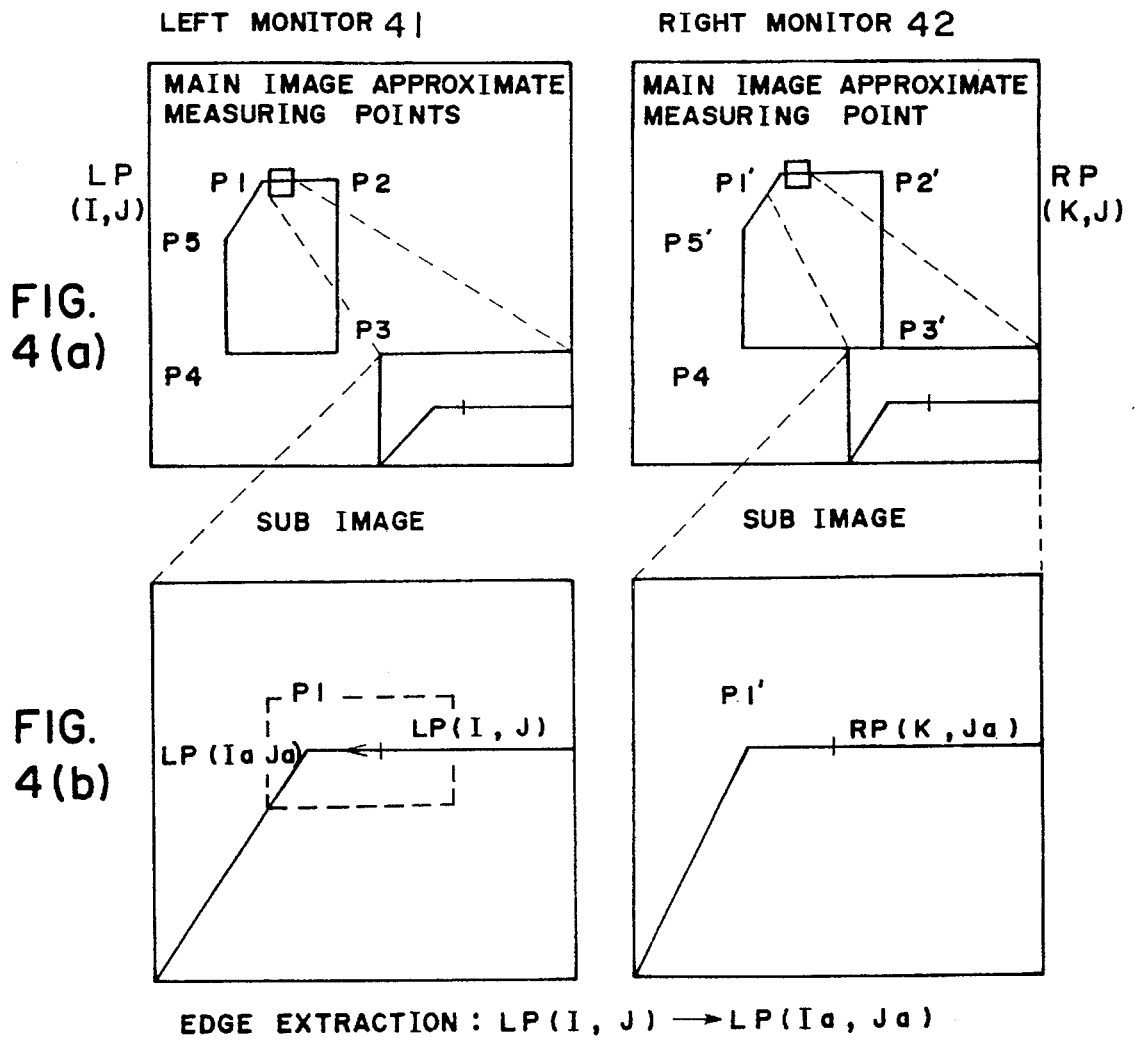

CORRELATION PROCESS: CORRESPOND LP(Ia,Ja)←→RP(Ka,Ja)

CORRESPOND: CURSOR DISPLAY, CONFIRMATION OF STEREOSCOPIC VISION

STEREO IMAGE MEASURING APPARATUS

BACKGROUND OF THE INVENTION

The present invention relates to a stereo image measuring apparatus for displaying stereo images and effecting three-dimensional measurement and a correlation process on a screen for displaying the stereo images, and particularly to a stereo image measuring apparatus capable of displaying a part of images at a large enlargement ratio, easily taking hold of measuring points and effecting a correlation process after feature points have been extracted in the vicinity of the position where each cursor exists.

A technique for analyzing stereo images has heretofore been used, for example, in a photogrammetry field, particularly for the creation of a topographical map.

When it is desired to analyze the stereo images, it is necessary to retrieve either one of left and right positions and the other corresponding points corresponding to the one position. As a method of retrieving the corresponding points, there were used those such as a visual observing method and a method using a correlation process, etc. Any of these retrieval methods was effected so as to three-dimensionally display only a portion of the stereo images.

However, the conventional method of locally displaying only the portion of the stereo images develops a problem from the standpoint of the efficiency of measuring work in that it is difficult to measure the displayed local image while deciding to which position the local image corresponds over the entire image because the stereo images displayed on a monitor are represented at a relatively high magnification.

In recent years, a process for three-dimensionally analyzing digital images obtained from a CCD camera or the like has been actively effected. There has been a strong demand for the appearance of a stereo image displaying apparatus which enables one to freely varying the magnification of each image regardless of a photographing distance of the camera and measuring the image with high accuracy.

There is a situation in which when each position is measured to draw a border or contour line or the like corresponding to an object to be measured, points for the next border line are not displayed on a display screen. It is therefore necessary to simultaneously scroll stereo images and line drawings. However, the scrolling work has a problem in that the transfer of image data and the drawing of line drawings wastes time and does not lend itself to efficient image measurement.

Further, the conventional method of locally displaying the portion of the stereo images was often effected with due regard to feature points suitable for correlation because the designation of measuring points was manually effected by a measurer.

Therefore, even if a correlation process for determining corresponding points is effected, there is a case in which the corresponding points cannot be reliably obtained. Therefore, there has been a strong demand for the appearance of a stereo image measuring apparatus capable of reliably retrieving the corresponding points.

BRIEF DESCRIPTION OF THE DRAWINGS

The above objects, features and advantages of the present invention will become apparent from the following description and the appended claims, taken in conjunction with the accompanying drawings, in which:

FIG. 4(a) is a view showing corresponding measuring points on the respective left and right main monitors;

FIG. 4(b) is a view showing left and right sub screen images corresponding to the measuring points highlighted in FIG. 4(a);

DETAILED DESCRIPTION OF THE PREFERRED EMBODIMENTS

[Method of measuring stereo images]

Figure 9:
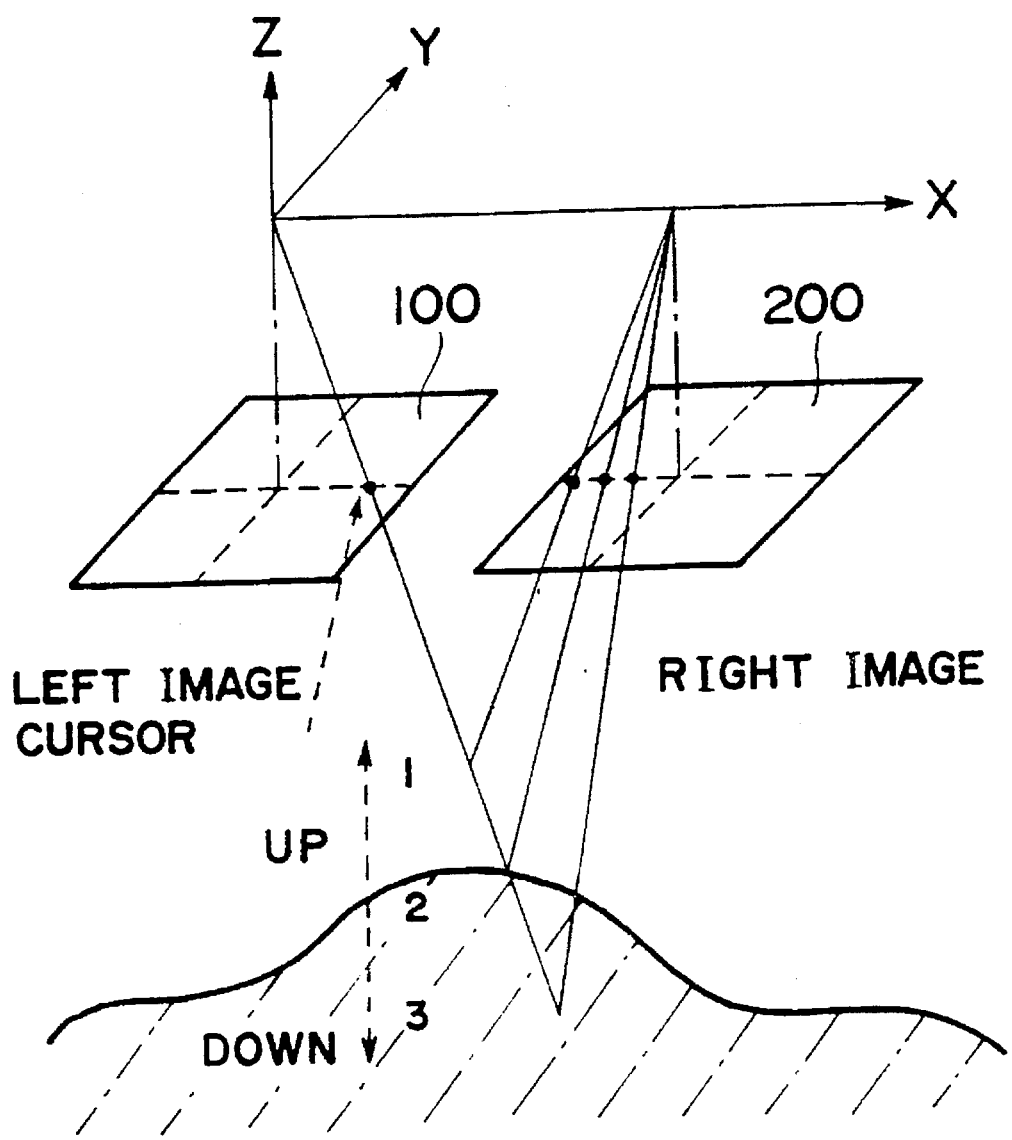
FIG. 9 is a view for explaining the basic principle of a method of measuring stereo images.

FIG. 9 shows the basic principle of a method of measuring stereo images. When left and right images 100 and 200 whose inclinations have been corrected by digital rectification processing are displayed on a 3D display, they are displayed as three-dimensional models. It is thus possible to three-dimensionally measure the images. These images have no y-parallax.

Therefore, if an X-directional parallax is associated with the images, then three-dimensional coordinates can be obtained based on the principle of triangulation. That is, as shown in FIG. 9, measuring points (cursors) are superposed and displayed on the left and right images respectively. Points to be measured are indicated in the left image 100 by using a three-dimensional mouse. Further, only the cursor in the right image 200 is shifted in the X direction (upward and downward) so as to be brought into alignment with the surface of an object.

Incidentally, a method of visually observing images depending on the ability of a user's stereoscopic vision or stereopsia is considered as the alignment method based on the stereoscopic vision referred to above. However, an automatic scanning or searching process using, for example, an image mutual relationship or image correlation processing for comparing the rates in similarity between densities of left and right images may also be effected. This type of automatic searching process using a computer is normally called "stereo matching".

Figure 1:
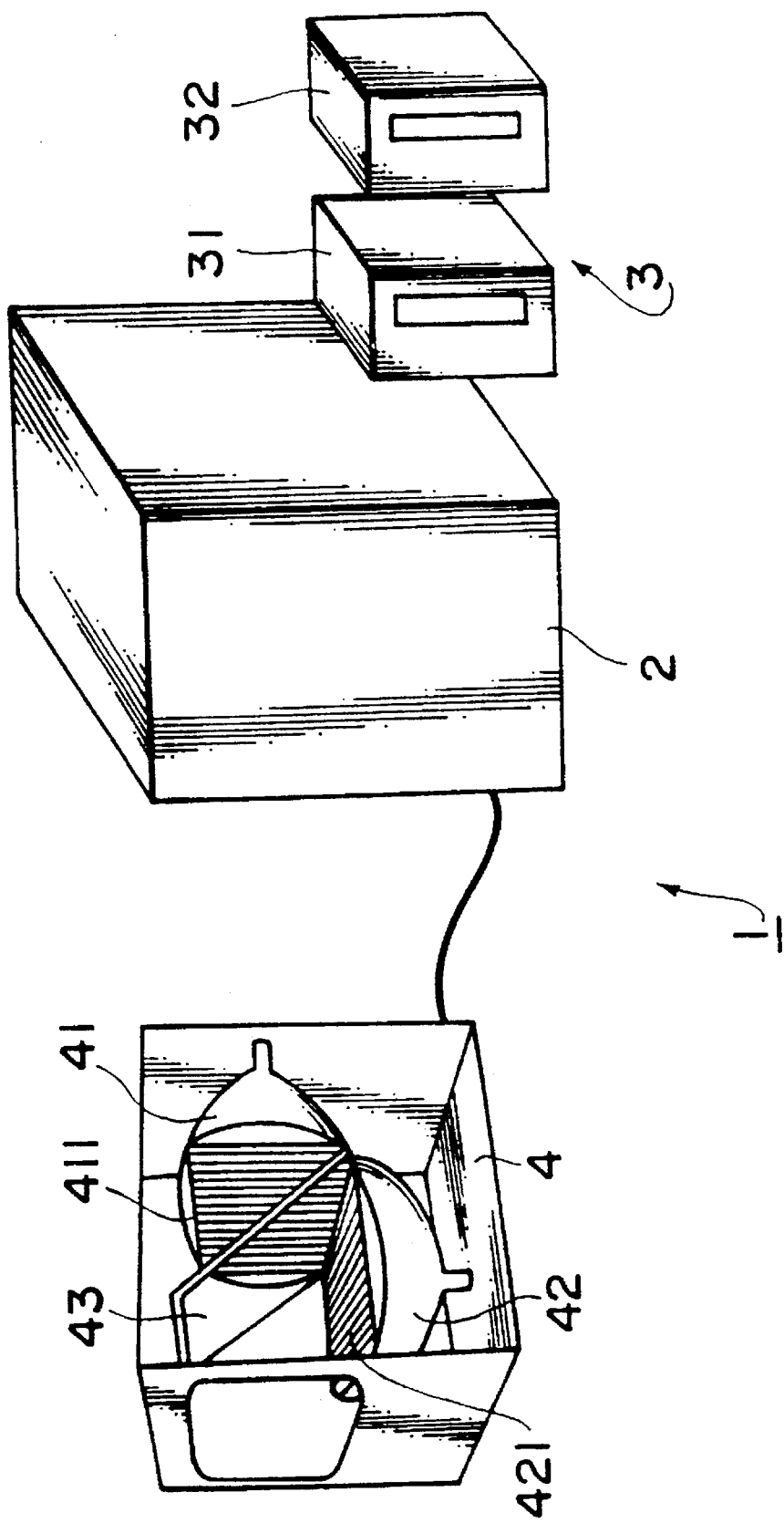
FIG. 1 is a schematic view showing the structure of a stereo image displaying apparatus according to one embodiment of the present invention.

The stereo image displaying apparatus 1 will next be described with reference to FIG. 1. The stereo image displaying apparatus 1 comprises a body 2 of a control device, an optical disk drive 31 for a left photograph, an optical disk drive 32 for a right photograph and a 3D monitor 4.

The control device body 2 serves as an arithmetic processor having a central processing unit, a memory and the like and effects the entire control of the stereo image displaying apparatus 1. The internal structure of the control device body 2 will be described in detail later. An optical disk drive 3 comprises the optical disk drive 31 for the left photograph and the optical disk drive 32 for the right photograph. The optical disk drive 3 is used to store therein a large quantity of image data produced from an external scanner or the like. The optical disk drive 31 serves as a memory for storing therein data about the left stereo image, whereas the optical disk drive 32 serves as a memory for storing therein data about the right stereo image. Incidentally, the memory is not necessarily limited to such optical disk drives. Any storing means may also be used so long as a mass-memory unit is used.

The 3D monitor 4 serves as a monitor device and can provide a stereoscopic image. The 3D monitor 4 comprises a high-resolution display 41 for a left image, a high-resolution display 42 for a right image and a half mirror 43. A polarizing filter 411 is mounted in front of the high-resolution display 41, whereas a polarizing filter 421 is provided in front of the high-resolution display 42. Polarizing characteristics of the polarizing filters 411 and 421 are set so as to meet at right angles to each other. A user can observe the stereo images stereoscopically by wearing orthogonal polarized glasses.

Figure 2:
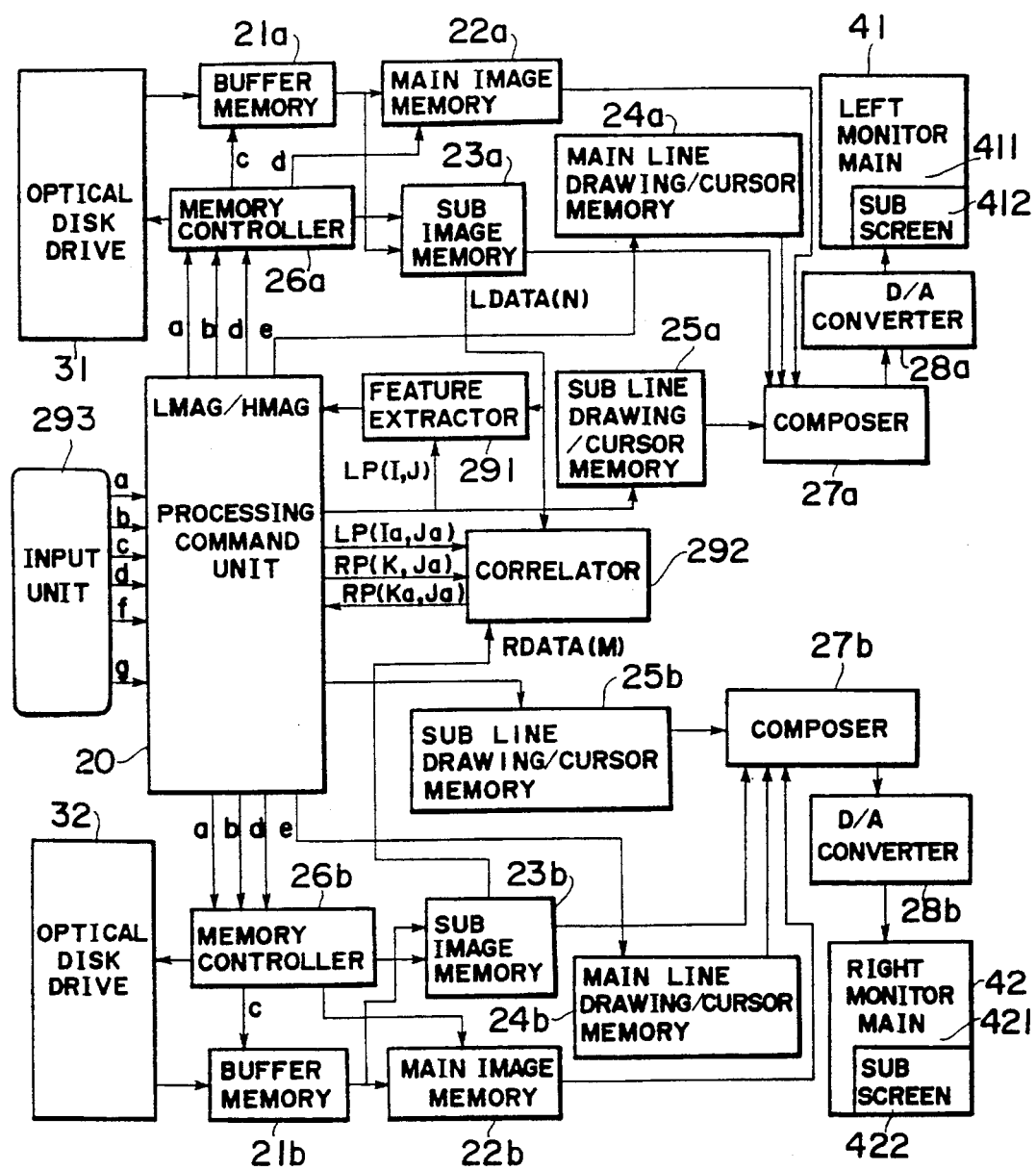
FIG. 2 is a block diagram showing the electrical configuration of a body 2 of a control device employed in the stereo image displaying apparatus shown in FIG. 1.

An electrical configuration of the control device body 2 will next be described with reference to FIG. 2.

The control device body 2 comprises a processing command unit 20, a buffer memory 21a, a buffer memory 21b, a main image memory 22a, a main image memory 22b, a sub image memory 23a, a sub image memory 23b, a main line drawing/cursor memory 24a, a main line drawing/cursor memory 24b, a sub line drawing/cursor memory 25a, a sub line drawing/cursor memory 25b, a memory controller 26a, a memory controller 26b, a composer 27a, a composer 27b, a D/A converter 28a, a D/A converter 28b, a feature extractor 291, and a correlator 292.

The buffer memory 21a, the main image memory 22a, the sub image memory 23a, the main line drawing/cursor memory 24a, the sub line drawing/cursor memory 25a, the memory controller 26a, the composer 27a and the D/A converter 28a provide an electrical configuration of a left-image system and are electrically connected to the high-resolution display (left monitor) 41.

Similarly, the buffer memory 21b, the main image memory 22b, the sub image memory 23b, the main line drawing/cursor memory 24b, the sub line drawing/cursor memory 25b, the memory controller 26b, the composer 27b and the D/A converter 28b provide an electrical configuration of a right-image system and are electrically connected to the high-resolution display (right monitor) 42.

Incidentally, the high-resolution display (left monitor) 41 is divided into a main screen 411 and a sub screen 412. The main screen 411 serves as a first display portion or region and has a first display area. Further, the main screen 411 serves so as to display a stereo image stored in a stereo image storage device at a first magnification. On the other hand, the sub screen 412 serves as a second display portion or region and has a second display area smaller than the main screen 411. Further, the sub screen 412 serves so as to display a stereo image falling within a range displayed by the main screen 411 at a second magnification larger than the first magnification.

Similarly, the high-resolution display (right monitor) 42 is divided into a main screen 421 and a sub screen 422. The main screen 421 has a first display area and displays thereon a stereo image at a first magnification, whereas the sub screen 422 has a second display area smaller than the main screen 421 and serves so as to display a stereo image falling within a range displayed by the main screen 421 at a second magnification larger than the first magnification.

The processing command unit 20 includes a central processor and the like and serves so as to effect a control process on the respective electrical configurations of the control device body 2.

The buffer memory 21a serves as a memory section or a stereo image storage device. Further, the buffer memory 21a is used to read image data for effecting a stereo image process from the optical disk drive 31 and to primarily store it therein.

The main image memory 22a corresponds to a main image memory section and serves so as to store therein image data for displaying a left stereo image on the main screen 411 corresponding to the first display region of the left monitor 41 at the first magnification.

The sub image memory 23a corresponds to a sub image memory section and serves so as to store therein image data for displaying the left stereo image on the sub screen 412 corresponding to the second display region of the left monitor 41 at the second magnification.

The main line drawing/cursor memory 24a has the same storage capacity as that of the main image memory 22a and serves so as to display white pixels only at the position where a line drawing and a cursor exist. The sub line drawing/cursor memory 25a has the same storage capacity as that of the sub image memory 23a and serves so as to display white pixels only at the position where a line drawing and a cursor exist.

The memory controller 26a is used to control the buffer memory 21a or the like and to control the main image memory 22a and the sub image memory 23a based on the magnifications of the main and sub screens 411 and 412.

The composer 27a makes a synthesis of image data in the main image memory 22a, the sub image memory 23a, the main line drawing/cursor memory 24a and the sub line drawing/cursor memory 25a so as to form combined image data. Further, the composer 27a outputs the combined image data to the left monitor 41 through the D/A converter 28a.

Likewise, the buffer memory 21b, the main image memory 22b, the sub image memory 23b, the main line drawing/cursor memory 24b, the sub line drawing/cursor memory 25b, the memory controller 26b, the composer 27b and the D/A converter 28b provide an electrical configuration of a right-image system. However, the electrical configuration of the right-image system is identical to one obtained by replacing the electrical configuration of the left-image system with that of the right-image system, and its description will therefore be omitted.

The feature extractor 291 is used to extract a feature of an image from image data. In the present embodiment, there is used a feature extracting method wherein signal processing is effected on the values of nine pixels adjacent to a designated point by using a Laplacian Gauss filter. The Laplacian Gauss filter effects the action of filtering of a digital image. The Laplacian Gauss filter is a sort of a spatial filter for effecting signal processing in a space identical to an image space. The Laplacian Gauss filter effects a secondary differential operation, which calculates differences between respective values in four directions of space about a given point. As a result, image portions which develop abrupt variations in density, can be extracted as characteristics or features.

The correlator 292 effects an automatic searching process using an image correlation for comparing the rates in similarity between densities of left and right images. Incidentally, details of the correlation process will be described later.

An input unit 293 inputs instructions such as the setting of various magnifications, the movement of a cursor, etc. to the processing command unit 20. Input means corresponding to all input methods such as a keyboard, a mouse, etc., can be used as the input unit 93.

Figure 3:
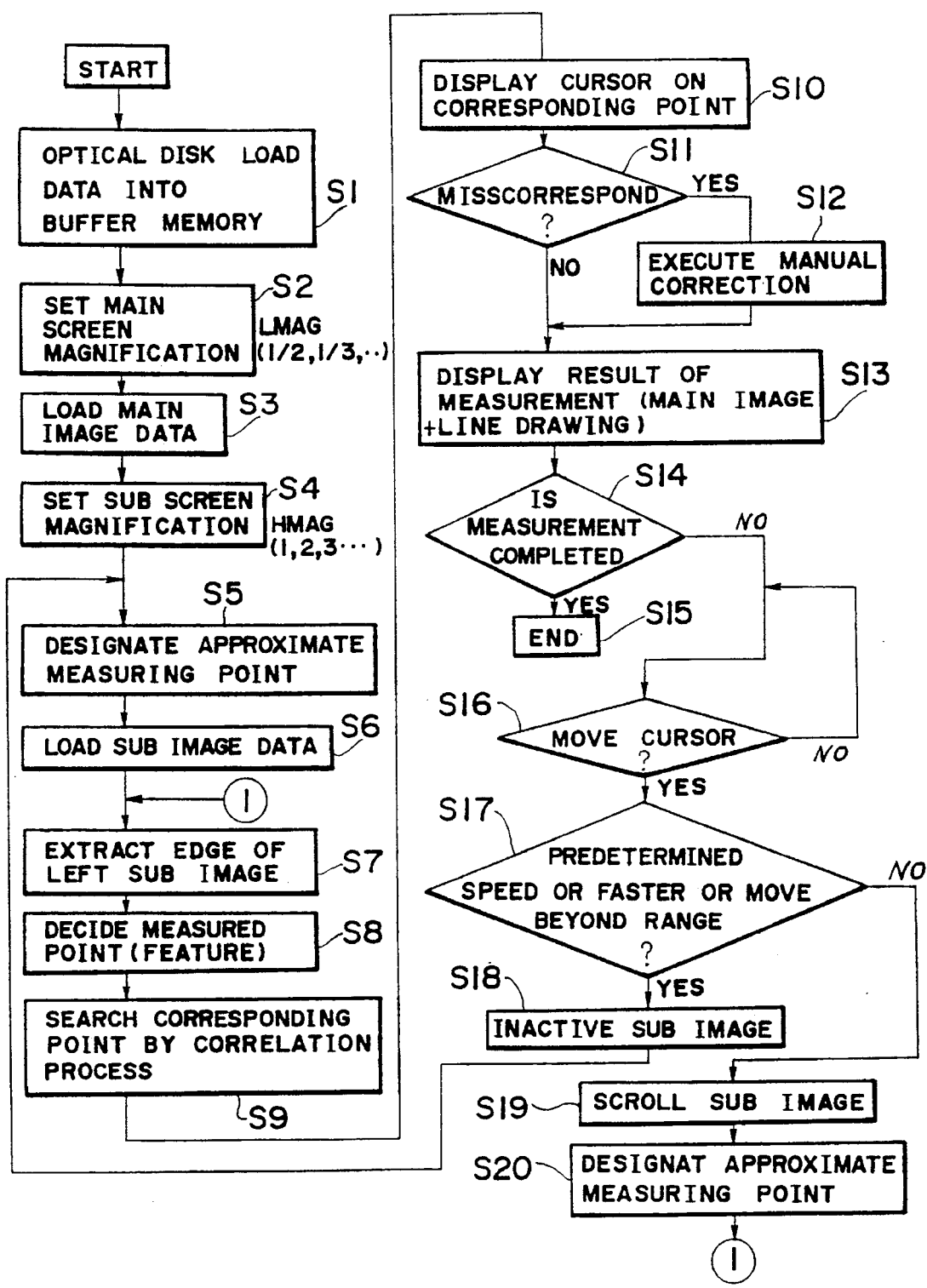
FIG. 3 is a flowchart for describing the operation of the stereo image displaying apparatus shown in FIG. 1.

The operation of the present embodiment constructed as described above will be described with reference to FIG. 3. When a three-dimensional measuring process is started, a left stereo image corresponding to an object to be processed is sent to the buffer memory 21a from the optical disk drive 31 as data in Step 1 (hereinafter abbreviated "S1"). Similarly, a right stereo image corresponding to an object to be processed is delivered to the buffer memory 21b from the optical disk drive 32 as data. Incidentally, the selection of the delivered images is executed by transmitting a selection image designating signal (a) to the processing command unit 20 from the input unit 293.

In S2, the input unit 293 then sets up and inputs magnifications (LMAG) of the main screens 411 and 421. In the present embodiment, the main screen magnifications (LMAG) are provided so that any of values (½, 1/3, ... ) is selected. If, however, a method capable of deciding one of the main screen magnifications (LMAG) is used, then any method can be adopted. Incidentally, the setting of each main screen magnification (LMAG) is executed by transmitting a main screen magnification designating signal (b) to the memory controllers 26a and 26b from the input unit 293 through the processing command unit 20.

In S3, the processing command unit 20 then causes the buffer memory 21a to transfer left-image data to the main image memory 22a at an address space or interval corresponding to the main screen magnification (LMAG). Similarly, right-image data is transferred to the main image memory 22b from the buffer memory 21b. Further, the memory controller 26a controls an address interval for the left-image data read from the buffer memory 21a in response to an address interval decision signal (c). Similarly, the memory controller 26b controls an address interval for the right-image data read from the buffer memory 21b. The address interval increases as each main screen magnification (LMAG) decreases. Thus, a reduced image is formed on the main image memory 22b.

Incidentally, the processing command unit 20, the memory controller 26a and the memory controller 26b for forming the reduced images on the main screens 411 and 421 effect the operation of a first transfer means.

In S4, the input unit 293 then sets up and inputs magnifications (HMAG) of the sub screens 412 and 422. In the present embodiment, the sub screen magnifications (HMAG) have been set up so that any of values (1, 2, 3, .. .) is selected. If, however, a method capable of deciding one of the sub screen magnifications (LMAG) is used, then any method can be adopted. Incidentally, the setting of each sub screen magnification (LMAG) is executed by transmitting a sub screen magnification designating signal (d) to the memory controllers 26a and 26b from the input unit 293 through the processing command unit 20. Each sub screen magnification (HMAG) is normally set so as to be larger than each main screen magnification (LMAG).

In S5, the input unit 293 then inputs a cursor moving signal (e) so as to move the cursor back and forth. As shown in FIG. 4(a), a left main-image approximate measuring point LP (I, J) and a right main-image approximate measuring point RP (K, J) are designated on the main screens 411 and 421 respectively. That is, an operator moves left and right cursors in such a manner that they are positioned on points to be measured while observing the screen of the monitor 4, and designate the left and right main-images approximate measuring points. After the designation of the left and right main-images approximate measuring points, square frames, which show measuring regions for the sub screens 412 and 422, are respectively displayed on the main screens 411 and 421 in such a manner that the LP (I, J) and the RP (K, J) are defined as the central points. In the present embodiment, five main-image approximate measuring points are set up. That is, the left main-image approximate measuring point LP (I, J) comprises P1, P2, P3, P4 and P5. The right main-image approximate measuring point RP (K, J) comprises P1', P2', P3', P4' and P5'. The P1, P2, P3, P4 and P5 are hereinafter successively measured one by one in that order.

Incidentally, the input unit 293 and the processing command unit 20 effect the operation for control of cursors for designating the measuring points on the main screens 411 and 421.

In S6, the processing command unit 20 then causes the buffer memory 21a to transfer the left-image data to the sub image memory 23a at an address space or interval corresponding to the sub screen magnification (HMAG). Similarly, the right-image data is transferred to the sub image memory 23b from the buffer memory 21b. Further, the memory controller 26a controls an address interval for the left-image data read from the buffer memory 21a in response to the address interval decision signal (c). Similarly, the memory controller 26b controls an address interval for the right-image data read from the buffer memory 21b. The address interval decreases as the sub screen magnification (HMAG) increases. Thus, an enlarged image is formed on the sub image memory 23b.

Incidentally, the processing command unit 20, the memory controller 26a and the memory controller 26b for forming the compressed images on the sub screens effect the operation of a second transfer means.

A process for extracting a feature on the left sub screen 412 is next effected in S7. The feature extracting process is executed by the Laplacian Gauss filter in the feature extractor 291.

In S8, a reference measuring point at which the feature has been extracted from the left sub screen 412, is decided as LP (Ia, Ja) as illustrated in FIG. 4(b).

Figure 4C:
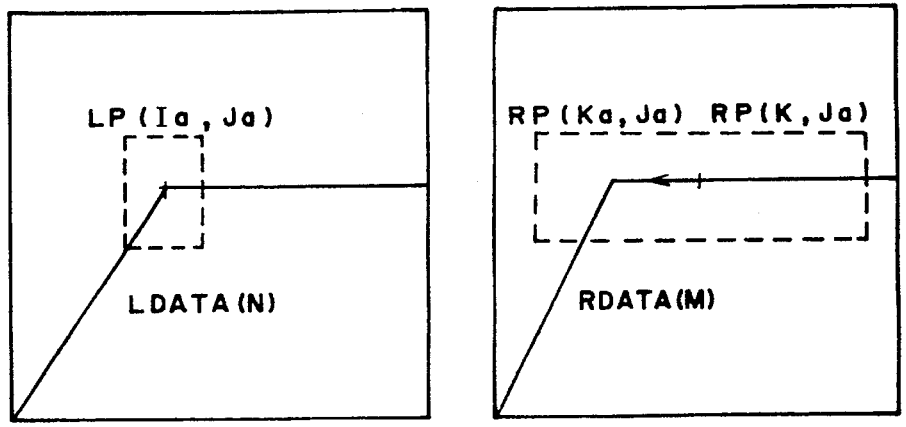
FIG. 4(c) is a view showing corresponding left and right reference measuring points on the left and right sub screens.

A correlation process is further effected by the correlator 292 in S9. As the correlation process, there is normally used one such as an absolute difference process, a correlation coefficient process or the like. That is, as shown in FIG. 4(c), a corresponding point RP (Ka, Ja) on the right sub screen 422 corresponding to the reference measuring point LP (Ia, Ja) on the left sub screen 412, which has been decided in S8, is scanned or searched.

The left and right image cursors are next displayed in S10. That is, the reference measuring point LP (Ia, Ja) is displayed on the main screen 411 and the sub screen 412 of the left monitor 41. Further, the corresponding point RP (Ka, Ja) is displayed on the main screen 421 and the sub screen 422 of the right monitor 42.

Figure 4D:
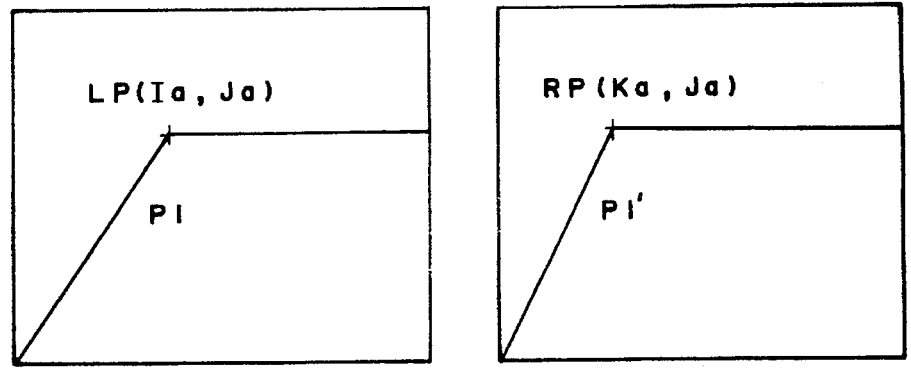
FIG. 4(d) is a view showing correspondence of the reference measuring points.

Further, a stereoscopic vision process is effected in S11 as shown in FIG. 4(d) and the operator confirms the corresponding point. That is, such a procedure is carried out because there is sometimes a case in which an error occurs in the correlation process when the left and right images do not present features and extremely similar images exist in the left and right images.

When an error in the corresponding point has been produced or found out in S11, the routine proceeds to S12, where the position of the right cursor is forcedly corrected. Afterwards, the routine proceeds to S13.

In S13, line drawings obtained by connecting the previous corresponding point to the present corresponding point and connecting the previous measured point to the present measured point are written into the main line drawing/cursor memories 24a and 24b as data and displayed on the main screens 411 and 421. This function represents a connecting means.

In the present embodiment, it is then decided in S14 whether the measurement of P5 has been completed. If the answer is YES in S14, then the routine proceeds to S15, where the measurement is finished. If the answer is NO in S14, then the routine proceeds to S16, where it is decided whether each cursor is being moved. If the answer is YES in S16, that is, if it is determined that the measurement continues, then the routine proceeds to S17.

It is decided in S17 whether the moving speed of the cursor is a predetermined speed or greater or the cursor is being moved toward a region other than each of the sub screens 412 and 422. If the answer is YES in S17, then the routine proceeds to S18, where the sub screens 412 and 422 are made inactive and the routine is returned to S5, where the measurement is repeated. If the answer is NO in S17, then the routine proceeds to S19, where the sub screens 412 and 422 are scrolled. Then, the routine proceeds to S20, where the approximate measuring points are designated in the same manner as in S5, after which the routine proceeds to S7.

In the present embodiment, the aforementioned measurement has been described by the method of designating the five points of P1 through P5. However, the five points can also be changed to an appropriate number of points according to the contour of an object, for example.

In S13, the respective corresponding points can be not only simply connected to one another by line segments but also measured as a polyline. The polyline represents a graphic form obtained by connecting several line segments to one another and also shows one obtained by continuously connecting measuring points with line segments each time the measurement is carried out.

Figure 5A:
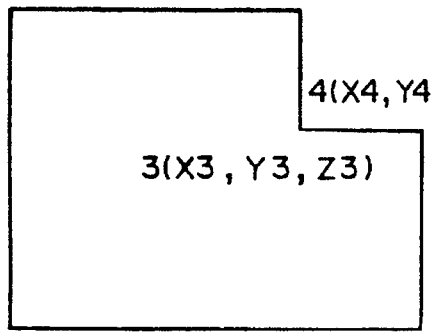
FIG. 5(a) is a first view for describing the measurement of polylines by the stereo image displaying apparatus shown in FIG. 1.
Figure 5B:
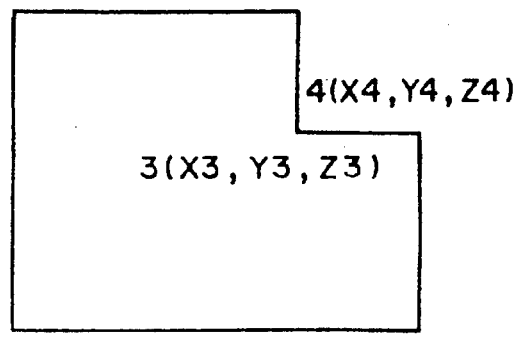
FIG. 5(b) is a second view for describing the measurement of polylines by the stereo image displaying apparatus shown in FIG. 1.

FIG. 5(a) and 5(b) shows one example of the result of successive measurement of respective vertexes of 1 through 6. When the measurement is completed, the term "close polyline" (see FIG. 5(a)) is designated or the term "open polyline" (see FIG. 5(b)) is designated. Further, when the measurement is made erroneously, the vertexes can also be added and eliminated. If an interval between the left and right cursors is controlled under the condition of a given height (Z) and the polyline measurement is effected, then a contour line can also be drawn.

Figure 6A:
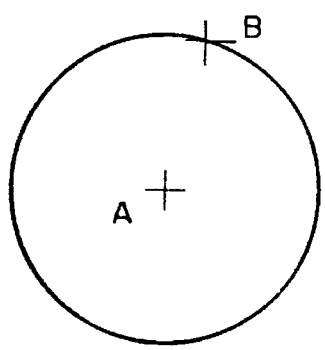
FIG. 6(a) is a first view for describing the measurement of each circle by the stereo image displaying apparatus shown in FIG. 1.
Figure 6B:
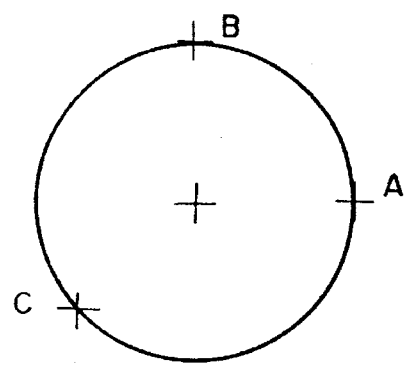
FIG. 6(b) is a second view for describing the measurement of each circle by the stereo image displaying apparatus shown in FIG. 1.
Figure 7:
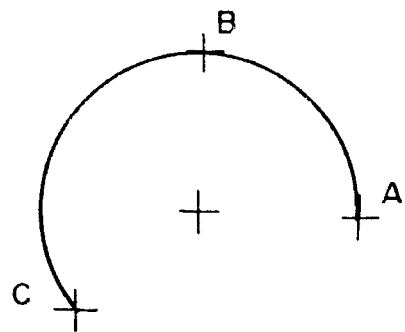
FIG. 7 is a view for explaining the measurement of an arc by the stereo image displaying apparatus shown in FIG. 1.

Further, the measurement of a circle and an arc can also be used as well as the polyline measurement. The circle measurement includes one in which the central point A and the radius B are designated and graphic data about the circle is produced or measured under this condition as shown in FIG. 6(a), and one in which three points, i.e., A, B and C on the circumference of a circle are designated or measured as shown in FIG. 6(b). The arc measurement is effected in such a manner that an arc start point A, an arc end point C and an intermediate point B on the circumference of a circle are defined thereby to produce or measure graphic data about the arc as shown in FIG. 7. By making use of the polyline measurement, the circle measurement or the arc measurement, for example, it is possible to meet the convenience of drawing of a border or contour line of an object to be measured. Further, graphic data can be controlled based on several point data.

Incidentally, each main screen magnification (LMAG) corresponds to the first magnification and each sub screen magnification (HMAG) corresponds to the second magnification. Further, the input unit 293, the processing command unit 20, the memory controller 26a and the memory controller 26b all of which are used for setting up and changing these magnifications, correspond to a magnification setting unit or portion. The present embodiment describes the case where the correlation process is used only in the case of measurement of the images on the sub screens 412 and 422. As an alternative, however, the correlator 292 may also be constructed in such a manner that data are transferred from the main image memories 22a and 22b and the correlation process is used even in the case of designation of the approximate measuring points on the main screens 411 and 421 thereby to decide the positions of the cursors.

The correlation process of the correlator 292 will next be described in detail with reference to FIG. 8. In the present embodiment, a data string in the reference image data about the left image, which is adjacent to a measuring point, is searched from an image data group about the right image so as to find out a similar data string. The absolute difference process has been used as this searching process. As will be described in detail below, this process or approach is effected in such a manner that a data string at which the absolute difference is brought to the minimum, is retrieved and a corresponding point is calculated based on an image address for the data string.

Figure 8:
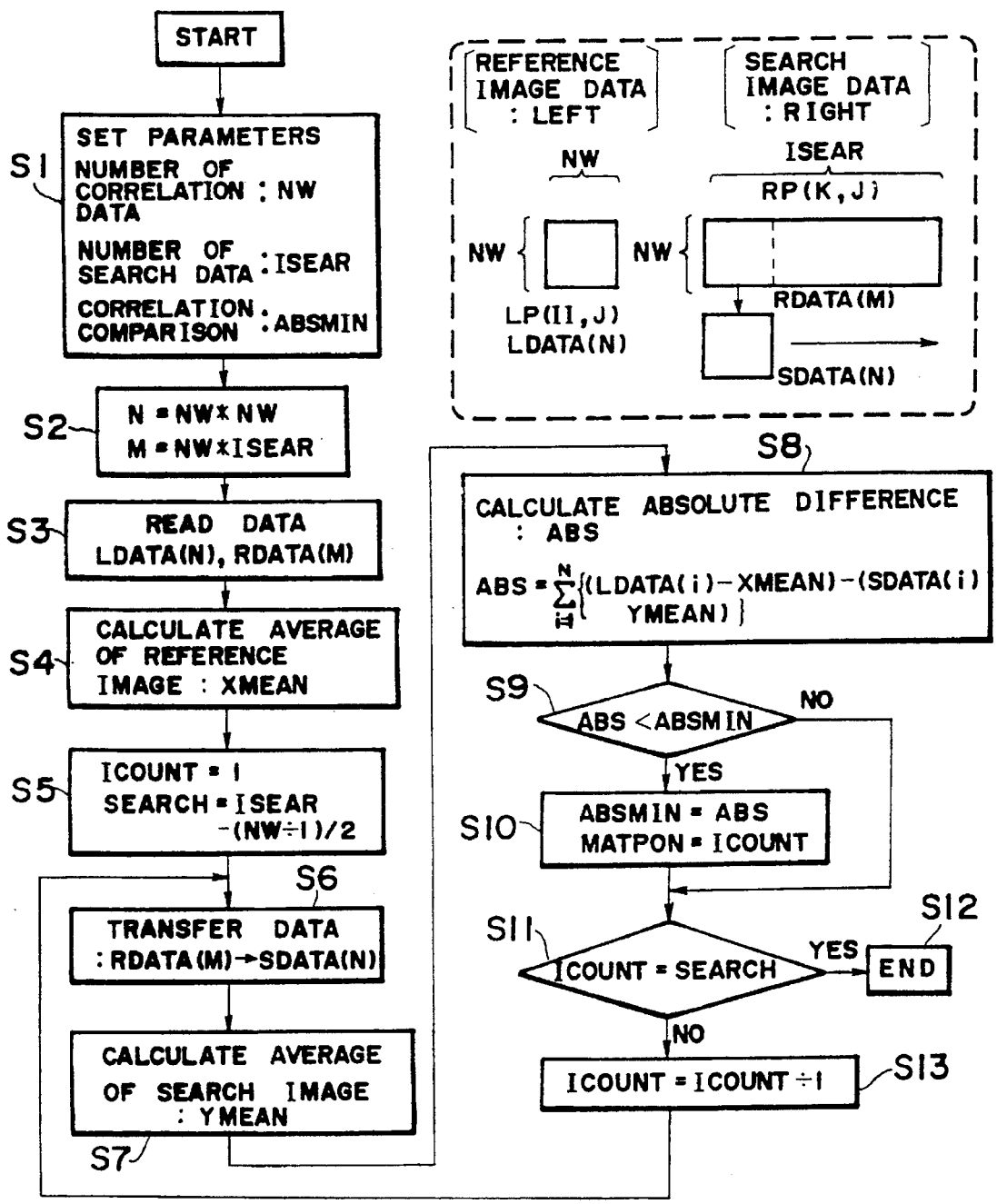
FIG. 8 is a view for describing the operation of a correlator employed in the stereo image displaying apparatus shown in FIG. 1.

In S1 of FIG. 8, respective parameters are input through the input unit 293. In the present embodiment, the number of correlation data NW, the number of search data ISEAR, a correlation comparison ABSMIN are set up. The NW means that the reference image data represented in the form of a square in which the number of the correlation data is NW as seen in the vertical direction and NW as seen in the horizontal direction, is set to near the measuring points in the left image. The ISEAR shows the number of search image data arranged in the horizontal direction and corresponding to a data string for the right image associated with the reference image data. In other words, the ISEAR shows the number of horizontally arranged data strings for the right image represented in the form of a rectangle in which the number of the correlation data is NW as seen in the vertical direction and the number of search data is ISEAR as seen in the horizontal direction. The correlation comparison ABSMIN is set as an initial value from the standpoint of a numerical operation in order to retrieve a state in which the absolute difference to be computed is brought to the minimum.

Next, the number N of reference image data about the left image is calculated in S2. Since the reference image data is represented in the form of the square in the present embodiment, NW*NW represents the number N of the reference image data. In S2 as well, the number M of the search image data about the right image is calculated. That is, since the number of the search image data is NW as seen in the vertical direction in a manner similar to the reference image data, the number M of the search image data about the right image becomes NW*ISEAR.

In S3, the reference image data about the left image is read from the sub image memory 23a as LDATA (N), and the search image data about the right image is read from the sub image memory 23b as RDATA (M).

Next, the sum of LDATA (N) is calculated in S4 and divided by N, thereby calculating the reference image average value XMEAN.

In S5, 1 is substituted in ICOUNT and SEARCH is defined. This SEARCH represents the number of search image data corresponding to one block represented in the form of a square having the number of the data corresponding to NW in the vertical direction and the number of the data corresponding to NW in the horizontal direction both of which are set to the right image associated with the reference image data. The ICOUNT in the present embodiment represents to which block the search image data corresponds as seen from the left side.

In S6, one block of the square search image data whose number is NW as seen in the vertical direction and NW as seen in the horizontal direction, is then set to the right image. Further, image data of a corresponding block is selected from the RDATA (M) of the search image data about the right image. The selected image data is transferred and stored as SDATA (N).

In S7, the sum of the SDATA (N) transferred and stored in S6 is obtained and divided by N, thereby calculating the average value of the search images YMEAN.

In S8, Ai is next calculated over a range from i=1 to i=N from the following equation thereby to obtain the sum as ABS.

$$Ai=(LDATA(i)-XMEAN)-(SDATA(N)-YMEAN)$$

It is decided in S9 whether or not the ABS obtained in S8 is smaller than ABSMIN. If the answer is YES in S9, then the routine proceeds to S10, where the ABS is substituted in and replaced by the ABSMIN. Further, the value of the ICOUNT at this time is stored as MATPON.

Then, the routine proceeds to S11, where it is decided whether or not the ICOUNT coincides with the SEARCH. That is, if the answer is YES in S11, then all of the SDATA (N) corresponding to the respective blocks are read from the search image data RDATA (M) about the right image and thus the correlation process is entirely completed. In this case, a process in S12 is finished and a block of search image data corresponding to the ICOUNT stored as the MATPON becomes a block (i.e., a corresponding data string) in the search image data about the right image, corresponding to the reference image data about the left image.

If the answer is NO in S11, then the routine proceeds to S13, where ICOUNT+1 is substituted in ICOUNT to change one block of the search image data to a block located just to the right of the one block. Afterwards, the routine is returned to S6.

By repeatedly effecting the above-described operation, the ICOUNT having the least ABS can be determined. A block in the search image data about the right image, which has been defined by the ICOUNT, represents desired corresponding points.

According to the present invention constructed as described above, each of stereo image storage devices stores at least one pair of stereo images therein. Each of first display portions each having a first display area displays thereon the stereo images stored in each of the stereo image storage devices at a first magnification. Each of second display portions each having a second display area smaller than the first display area displays thereon the stereo images falling within a range displayed by each first display portion, at a second magnification larger than the first magnification. Therefore, an excellent effect can be brought about that it is possible to determine with great ease to which position the present measuring point corresponds with respect to the entire region and the searching of points corresponding to measuring points can be achieved with high accuracy and at high reliability.

According to the present invention as well, a magnification setting unit can make changes in the first magnification displayed by the first display portion and the second magnification displayed by the second display portion.

Further, the present invention shows a stereo image measuring apparatus for displaying left and right stereo images on monitor devices respectively so as to three-dimensionally view the images. Each of memories stores left and right stereo image data therein. Each monitor has first and second display regions for three-dimensionally displaying at least two kinds of images thereon. Each of main image memories stores therein image data for displaying the left and right stereo images on each first display region at the first magnification. A first transfer means transfers under compression the left and right stereo image data from each memory so as to be displayed on the first display region of each monitor at the first magnification. Each of sub image memories stores therein image data for displaying the left and right stereo images on the second display region of each monitor at the second magnification. Each cursor designates measuring points onto a main image displayed on each first display region. When the measuring points are designated on the main image displayed on each first display region by the cursor, a second transfer means transfers image data near the measuring points to the sub image memory so as to be displayed on each monitor at the second magnification larger than the first magnification based on the left and right stereo image data stored in each memory.

According to the present invention constructed as described above, each storage device stores at least one pair of stereo images therein. Each of display portions or units displays thereon the stereo images stored in each of the stereo image storage devices. Each of cursor moving devices or portions moves each cursor into the stereo images displayed on the display portion. A feature extractor extracts feature points in the vicinity of the placement position of the cursor at one image of the stereo images displayed on the display portions, thereby deciding the feature points as measured points. Further, a correlation processor searches corresponding points for other image, which correspond to the measuring points for one image. The display portions respectively apply marks on the searched corresponding points based on the measured points and the result of the correlation process. Therefore, an excellent effect can be obtained that the correlation process can be carried out on the basis of points near the feature points and the corresponding points can be reliably found out.

According to the present invention as well, each stereo image storage device stores at least one pair of stereo images therein. Each of first display portions each having a first display area displays thereon the stereo images stored in each stereo image storage device at a first magnification. Each of cursor moving devices or portions moves each cursor into the stereo images displayed on the first display portion. Each of second display portions each having a second display area smaller than the first display area displays thereon the stereo images falling within a range near each cursor at a second magnification larger than the first magnification. A feature extractor extracts feature points in the vicinity of the placement position of the cursor at one image of the stereo images displayed on the second display portion, thereby deciding the feature points as measured points. Further, a correlation processor searches corresponding points for other image, which correspond to measuring points for one image. The first and second display portions respectively apply marks on measuring points at each cursor and points corresponding to the measuring points based on the result of the correlation process.

Further, in the present invention, a connecting means may join previously measured points to points which have been measured this time. Further, the connecting means may connect previously measured corresponding points based on a correlation process to corresponding points which have been measured this time.

Having now fully described the invention, it will be apparent to those skilled in the art that many changes and modifications can be made without departing from the spirit or scope of the invention as set forth herein.

What is claimed is:

1. A stereo image measuring apparatus for respectively displaying left and right stereo images on monitors so that they are three-dimensionally viewed, comprising:

a pair of memories for storing left and right stereo image data therein respectively;

a pair of monitors each having first and second display regions and for three-dimensionally displaying at least two kinds of images thereon respectively;

a pair of main image memories for storing therein image data for respectively displaying the left and right stereo images on said first display regions of said monitors at a first magnification;

first transfer means for transferring under compression the left and right stereo image data from said memories so as to be displayed on said first display regions of said monitors at the first magnification;

a pair of sub image memories for storing therein image data for respectively displaying the left and right stereo images on said second display regions of said monitors at a second magnification;

a cursor for designating measuring points onto a main image displayed on each of said first display regions; and second transfer means for transferring image data adjacent to measuring points to each of said sub image memories so as to be displayed on each of said monitors at the second magnification larger than said first magnification based on the left and right stereo image data stored in said memories when the measuring points are designated on the main image displayed on each of said first display regions.

2. A stereo image measuring apparatus comprising:

a pair of stereo image storage devices for storing at least one pair of stereo images therein;

display units for displaying thereon the stereo images stored in said stereo image storage devices respectively;

cursor moving devices for moving cursors into the stereo images displayed on the display units respectively;

a feature extracting device for extracting feature points in the vicinity of the placement position of the cursor at one image of the stereo images displayed on said display units and for deciding said feature points as measured points; and a correlation processor for determining corresponding points for other image corresponding to the measuring points for said one image in accordance with a correlation process for searching the corresponding points;

said display units being constructed in such a manner that marks are applied on the determined corresponding points based on the measured points and the result of the correlation process.

3. A stereo image measuring apparatus according to claim 2, further comprising means for connecting previously measured points to points which have been measured this time and connecting previously measured corresponding points based on a correlation process to corresponding points which have been measured this time.

4. A stereo image measuring apparatus comprising:

a pair of stereo image storage devices for storing at least one pair of stereo images therein;

a pair of first display portions each having a first display area and for respectively displaying the stereo images stored in said stereo image storage devices at a first magnification;

cursor moving devices for respectively moving cursors into the stereo images displayed on said first display portion;

a pair of second display portions each having a second display area smaller than said first display area and for respectively displaying thereon the stereo images falling within ranges near the cursors at a second magnification larger than said first magnification;

a feature extracting device for extracting feature points in the vicinity of the placement position of the cursor at one image of the stereo images displayed on said each second display portion and for deciding said feature points as measured points; and a correlation processor for determining corresponding points for other image corresponding to the measuring points for said one image in accordance with a correlation process for searching the corresponding points for said other image;

said first and second display portions being constructed in such a manner that marks are respectively applied on the measured points at said each cursor and points corresponding to the measured points based on the result of the correlation process.

5. A stereo image measuring apparatus according to claim 4, further comprising means for connecting previously measured points to points which have been measured this time and connecting previously measured corresponding points based on a correlation process to corresponding points which have been measured this time.

* * * * *